(12) United States Patent
Fuller et al.

(10) Patent No.: US 7,960,046 B2
(45) Date of Patent: Jun. 14, 2011

(54) SULFONATED-PERFLUOROCYCLOBUTANE POLYELECTROLYTE MEMBRANES FOR FUEL CELLS

(75) Inventors: Timothy J. Fuller, Pittsford, NY (US); Michael Schoeneweiss, West Henrietta, NY (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 12/144,392

(22) Filed: Jun. 23, 2008

(65) Prior Publication Data

US 2008/0261102 A1 Oct. 23, 2008

Related U.S. Application Data

(63) Continuation of application No. 11/264,755, filed on Nov. 1, 2005, now abandoned.

(51) Int. Cl.
*H01M 8/10* (2006.01)
(52) U.S. Cl. ......... 429/33; 521/27; 525/326.2; 428/373; 428/401
(58) Field of Classification Search .............. 429/33; 521/27; 525/326.2; 428/373, 401
See application file for complete search history.

(56) References Cited

U.S. PATENT DOCUMENTS

| 5,037,917 | A | 8/1991 | Babb et al. |
| 5,910,378 | A * | 6/1999 | Debe et al. ............ 429/42 |
| 6,183,668 | B1 | 2/2001 | Debe et al. |
| 6,384,167 | B2 * | 5/2002 | DesMarteau et al. ...... 526/243 |
| 6,444,343 | B1 * | 9/2002 | Prakash et al. ............ 429/33 |
| 6,559,237 | B1 * | 5/2003 | Mao et al. ............ 525/326.2 |
| 2001/0018144 | A1 * | 8/2001 | Watakabe et al. ........ 429/33 |
| 2004/0214065 | A1 * | 10/2004 | Kanaoka et al. .......... 429/33 |
| 2005/0058864 | A1 | 3/2005 | Goebel |

FOREIGN PATENT DOCUMENTS

| JP | 2003-535929 T | 12/2003 |
| JP | 2005-179380 A | 7/2005 |
| WO | 2004/051776 A1 | 6/2004 |

OTHER PUBLICATIONS

Functional Fluoropolymers for Fuel Cell Membranes; R. Souzy, B. Ameduri, B. Boutevin, G. Gebel, P. Capron; Solid State Ionics 176 (2005); pp. 2839-2848.*
Souzy et al., Solid State Ionics, vol. 176, pp. 2839-2848 (2005).*
Smith et al., Macromolecules, vol. 29, pp. 852-860 (1996).*
Smith et al., Fluorine Chemistry, vol. 104, p. 109 (2000).*
Ford, L.A. et al., "New Aromatic Perfluorovinyl Ether Monomers Containing the Sulfonimide Acid Functionality," Polymeric Materials Science and Engineering; 2000; pp. 10-11; 83; American Chemical Society.
Souzy, R. et al., "Synthesis and (co)polymerization of monofluoro, difluoro, trifluorostyrene and ((trifluorovinyl)oxy) benzene," Prog. Polym. Sci. xx (2003) pp. 1-32.
Souzy, R. et al., "Functional fluoropolymers for fuel cell membranes," Prog. Polym. Sci. 30, 2005, pp. 644-687.

* cited by examiner

*Primary Examiner* — Peter D. Mulcahy
*Assistant Examiner* — Henry Hu
(74) *Attorney, Agent, or Firm* — Brooks Kushman PC

(57) ABSTRACT

A process for preparing a polymer comprising sulfonating a perfluorocyclobutane polymer with a sulfonating agent to form a sulfonated perfluorocyclobutane polymer, wherein the sulfonating agent comprises oleum, $SO_3$ or a combination thereof is provided. A process for preparing proton exchange membranes and fuel cells comprising the proton exchange membrane are also provided.

2 Claims, 8 Drawing Sheets

SULFONATED-PERFLUOROCYCLOBUTANE POLYELECTROLYTE MEMBRANES FOR FUEL CELLS

CROSS-REFERENCE TO RELATED APPLICATIONS

This application is a continuation of U.S. patent application Ser. No. 11/264,755 filed Nov. 1, 2005, the entire disclosure of which is hereby incorporated by reference.

BACKGROUND OF THE INVENTION

The present invention relates to electrochemical conversion cells, commonly referred to as fuel cells, which produce electrical energy by processing first and second reactants. For example, electrical energy can be generated in a fuel cell through the oxidation of an oxygen-containing gas and the reduction of a hydrogenous gas. By way of illustration and not limitation, a typical cell comprises a membrane electrode assembly positioned between a pair of flow fields accommodating respective ones of the reactants. More specifically, a cathode flowfield plate and an anode flowfield plate can be positioned on opposite sides of the membrane electrode assembly. The voltage provided by a single cell unit is typically too small for useful application so it is common to arrange a plurality of cells in a conductively coupled "stack" to increase the electrical output of the electrochemical conversion assembly.

By way of background, the conversion assembly generally comprises a membrane electrode assembly, an anode flowfield, and a cathode flowfield. The membrane electrode assembly in turn comprises a proton exchange membrane separating an anode and cathode. The membrane electrode assembly generally comprises, among other things, a catalyst supported by a high surface area support material and is characterized by enhanced proton conductivity under wet conditions. For the purpose of describing the context of the present invention, it is noted that the general configuration and operation of fuel cells and fuel cell stacks is beyond the scope of the present invention. Rather, the present invention is directed to particular polyelectrolyte membranes, processes for preparing polyelectrolyte membranes and polyelectrolyte membrane fuel cells. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864, and the accompanying text, present a detailed illustration of the components of a fuel cell stack—this particular subject matter is expressly incorporated herein by reference.

BRIEF SUMMARY OF THE INVENTION

Recently, proton exchange or polyelectrolyte membrane (PEM) fuel cells have attracted considerable interest as sources of non-polluting, high-density power for automotive propulsion. However, for widespread commercialization, low cost, high-performance PEMs with improved durability are still being sought. Presently, PEM fuel cells operate at temperatures up to 95° C. with external humidification being required to maintain proton conductivity that deteriorates rapidly as the membranes dry out. Perfluorosulfonic acid membranes have been the preferred materials for PEM, but they suffer from poor mechanical integrity and they are expensive. Consequently, new alternative PEM materials are continuously being sought.

The present invention is directed to a process for preparing a polymer. The process comprises sulfonating a perfluorocyclobutane polymer with a sulfonating agent to form a sulfonated perfluorocyclobutane polymer. The sulfonating agent comprises oleum, $SO_3$ or a combination thereof.

In accordance with another embodiment of the present invention, a process for preparing a proton exchange membrane is provided. The process comprises the steps of: (a) sulfonating a perfluorocyclobutane polymer with a sulfonating agent to form a sulfonated perfluorocyclobutane polymer and (b) forming the sulfonated perfluorocyclobutane polymer into a proton exchange membrane. The sulfonating agent comprises oleum, $SO_3$ or a combination thereof.

In accordance with yet another embodiment of the present invention, a fuel cell is provided. The fuel cell comprises a proton exchange membrane formed by sulfonating a perfluorocyclobutane polymer with oleum to form a sulfonated perfluorocyclobutane polymer and (b) forming the sulfonated perfluorocyclobutane polymer into a proton exchange membrane. The sulfonating agent comprises oleum, $SO_3$ or a combination thereof.

In accordance with a further embodiment of the present invention, a process for assembling a device comprises the act of preparing a membrane electrode assembly. The membrane electrode assembly comprises electrically conductive material on either side of a proton exchange membrane. The proton exchange membrane is prepared according to a process comprising the act of sulfonating a perfluorocyclobutane polymer with a sulfonating agent to form a sulfonated perfluorocyclobutane polymer, wherein the sulfonating agent comprises oleum, $SO_3$ or a combination thereof. The device comprises an electrochemical conversion assembly comprising at least one electrochemical conversion cell configured to convert first and second reactants to electrical energy. The electrochemical conversion cell comprises the membrane electrode assembly, an anode flowfield portion and a cathode flowfield portion defined on opposite sides of the membrane electrode assembly. A first reactant supply configured to provide a first reactant to an anode side of the membrane electrode assembly via the anode flowfield portion, and a second reactant supply configured to provide a second reactant to a cathode side of the membrane electrode assembly via said cathode flowfield portion.

BRIEF DESCRIPTION OF THE FIGURES

The following detailed description of specific embodiments of the present invention can be best understood when read in conjunction with the following figures.

DETAILED DESCRIPTION

Figure 1:
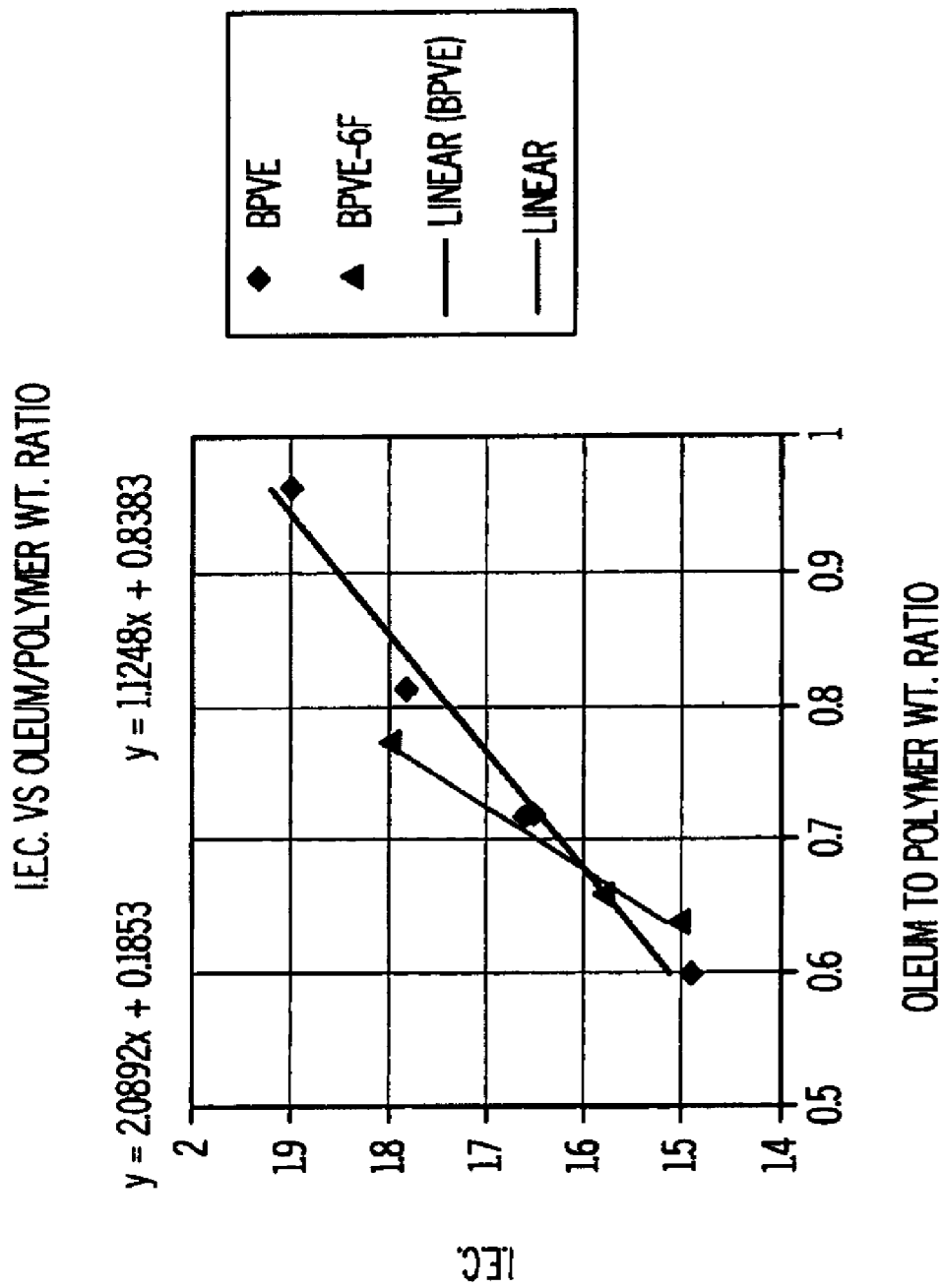
FIG. 1 is a graph depicting that the amount of sulfonation is determined by the ratio of oleum to polymer used.

The inventors have discovered a new process for preparing new proton conducting membranes made with perfluorocyclobutanes polymers (PFCBs) having sulfonic acid groups (SPFCBs,), which may be used in PEM fuel cells that can operate over a broad range of relative humidity and at temperatures around 95° C. The properties of the SPFCB films are dependent on the chemical structure and the ion exchange capacity of the film, which can be tailored by the reaction conditions used. These SPFCB-films are reasonable alternatives to perfluorosulfonic acid membranes, presently being used in PEM fuel cells, because the sulfonated polymers have high intrinsic proton conductivity and inherent dimensional-, hydrolytic- and high-temperature stability.

PFCBs are commercially available from Tetramer Technologies, under license agreements from Dow Chemical. Examples of PFCBs are provided with the structures 1-3:

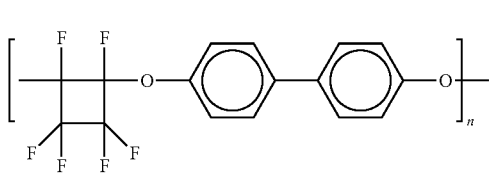

1 (BPVE)

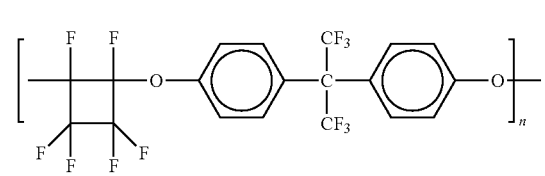

2 (6F)

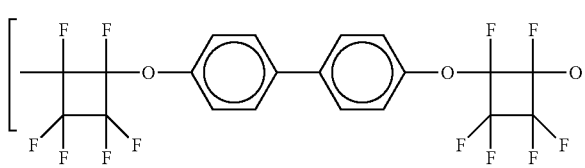

3 (BPVE 6F)

The synthesis of PFCBs is described in U.S. Pat. Nos. 5,037,917 and 5,159,037—this particular subject matter is expressly incorporated herein by reference.

To form potentially useful PEMs, subsequent sulfonation of the PFCBs is required. Prior art teaches a sulfonation procedure that uses chlorsulfonic acid, which has limited synthesis utility and scope and which produces inconsistent membrane materials. The inventors have discovered a novel process for synthesizing SPFCBs. The process comprises sulfonating a perfluorocyclobutane polymer with a sulfonating agent to form a sulfonated perfluorocyclobutane polymer. The sulfonating agent comprises oleum, SO$_3$ or a combination thereof. One skilled in the art will appreciate that various PFCBs are available for use in the present process, any of which may be employed herein. In one embodiment, the PFCB comprises the formula:

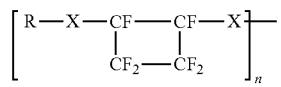

wherein X is O or S;

R is

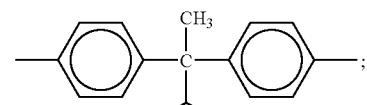

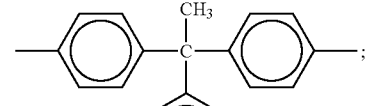

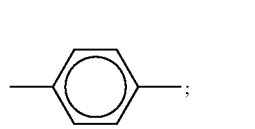 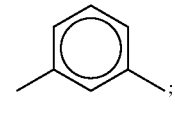

-continued

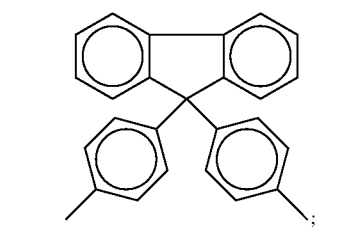

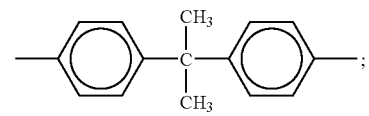

-continued

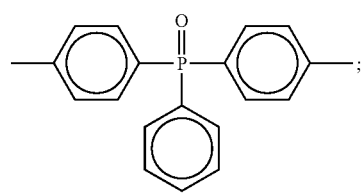

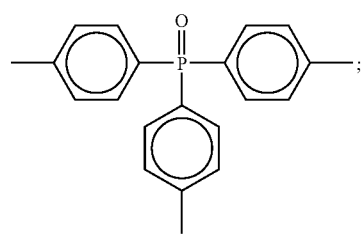

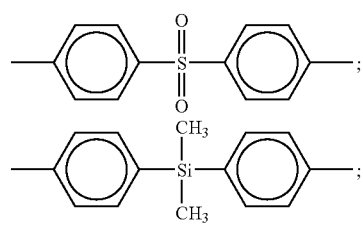

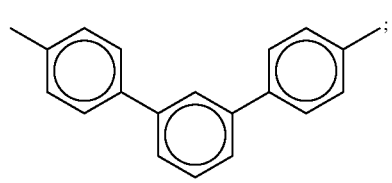

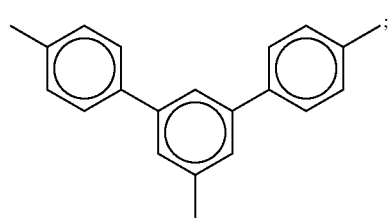

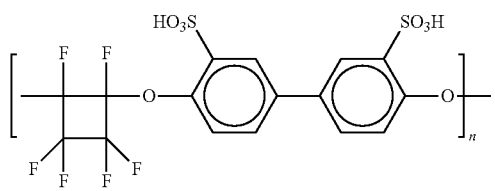

-continued

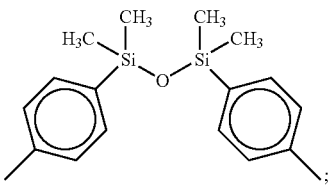

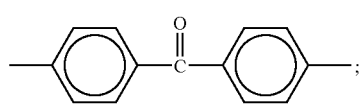

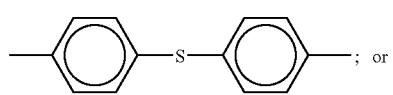

; or

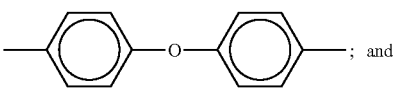

; and n is greater than about 20.

In one embodiment, n is from about 20 to about 500. Specific examples of such PFCBs include, but are not limited to, structures 1-3, defined in detail above.

In addition, one skilled in the art will appreciate that various concentrations of the sulfonating agent may be employed to sulfonate a PFCB polymer, any of which may be employed herein. In one embodiment, the oleum comprises 10% oleum. In another embodiment, the oleum comprises 20% oleum. In yet another embodiment, the oleum comprises 30% oleum. Moreover, one skilled in the art will appreciate that various SPFCBs may be formed from reacting a PFCB with a sulfonating agent. In one embodiment, the sulfonated polymers have between 0-2 sulfonic acids per repeat unit. Examples of such SPFCBs include, but are not limited to, structures 4-6:

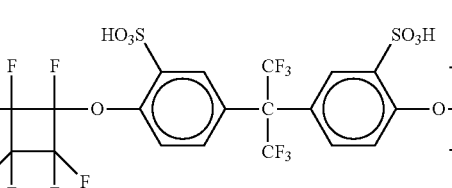

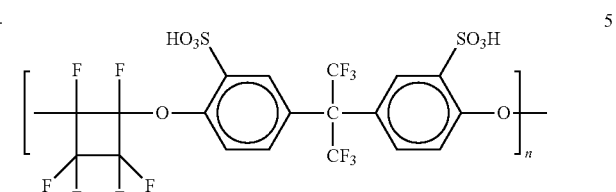

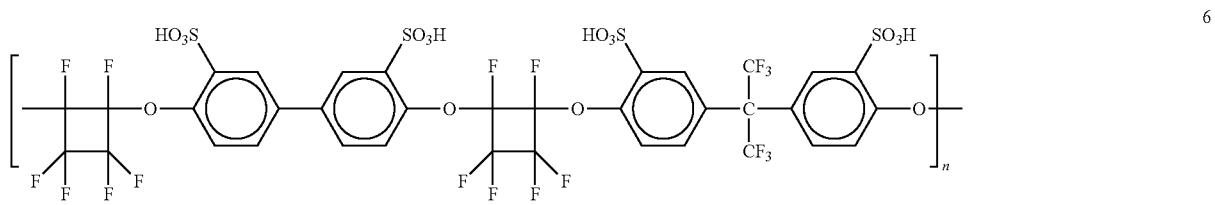

Furthermore, one skilled in the art will appreciate the various experimental parameters in which the process for preparing the sulfonated polymer may be performed, any of which may be employed herein. In one embodiment, the process further comprises the step of dissolving the PFCB polymer in methylene chloride prior to sulfonating the PFCB. In another embodiment, the process is performed from about −20° C. to about 200° C.

In accordance with another embodiment of the present invention, a process for preparing a proton exchange membrane is provided. The process comprises the steps of: (a) sulfonating a perfluorocyclobutane polymer with a sulfonating agent to form a sulfonated perfluorocyclobutane polymer and (b) forming the sulfonated perfluorocyclobutane polymer into a proton exchange membrane. The sulfonating agent comprises oleum, $SO_3$ or a combination thereof.

In accordance with yet another embodiment of the present invention, a fuel cell is provided. The fuel cell comprises a proton exchange membrane formed by sulfonating a perfluorocyclobutane polymer with a sulfonating agent to form a sulfonated perfluorocyclobutane polymer and (b) forming the sulfonated perfluorocyclobutane polymer into a proton exchange membrane. The sulfonating agent comprises oleum, $SO_3$ or a combination thereof. As shown in the Example, SPFCB membranes prepared according to the present invention have markedly improved and consistent fuel cell performance compared with those of the prior art. In one embodiment, the SPFCB copolymer has an ion exchange capacity of from about 0.6 to about 2.5 meq/gram. In another embodiment, the SPFCB copolymer has an ion exchange capacity of from about 1.3 to about 2.0 meq/gram.

In accordance with a further embodiment of the present invention, a process for assembling a device comprises the act of preparing a membrane electrode assembly. The membrane electrode assembly comprises electrically conductive material on either side of a proton exchange membrane. The proton exchange membrane is prepared according to a process comprising the act of sulfonating a perfluorocyclobutane polymer with a sulfonating agent to form a sulfonated perfluorocyclobutane polymer, wherein the sulfonating agent comprises oleum, $SO_3$ or a combination thereof. The device comprises an electrochemical conversion assembly comprising at least one electrochemical conversion cell configured to convert first and second reactants to electrical energy. The electrochemical conversion cell comprises the membrane electrode assembly, an anode flowfield portion and a cathode flowfield portion defined on opposite sides of the membrane electrode assembly. A first reactant supply configured to provide a first reactant to an anode side of the membrane electrode assembly via the anode flowfield portion, and a second reactant supply configured to provide a second reactant to a cathode side of the membrane electrode assembly via said cathode flowfield portion.

EXAMPLE

Treatment of Polymers with Structures 1, 2, and 3 with 30% Oleum

The properties of the SPFCB films are dependent on the chemical structure and the ion exchange capacity of the films, and performance can be tailored by the reaction conditions used. The amount of oleum specified in Table 1 is added to the respective polymer 1, 2 or 3, (ca 1 gram) dissolved in methylene chloride (5 mL) in a screw cap jar. The jar lid is secured and then the jar is shaken vigorously. A purple gel immediately forms, and then the jar is placed on a roll mill for between 0.5 and 1 hour. A clear liquid phase separates, which is decanted off and discarded, and the purple solid is added to vigorously stirred water (250 mL) using a Waring blender. The polymer becomes swollen white crumbs, which are isolated by vacuum filtration, washed with water and then air-dried. The sulfonated polymer (ca 1 g) readily dissolves in tetrahydrofuran (4 mL) and methanol (2 mL).

Figure 2:
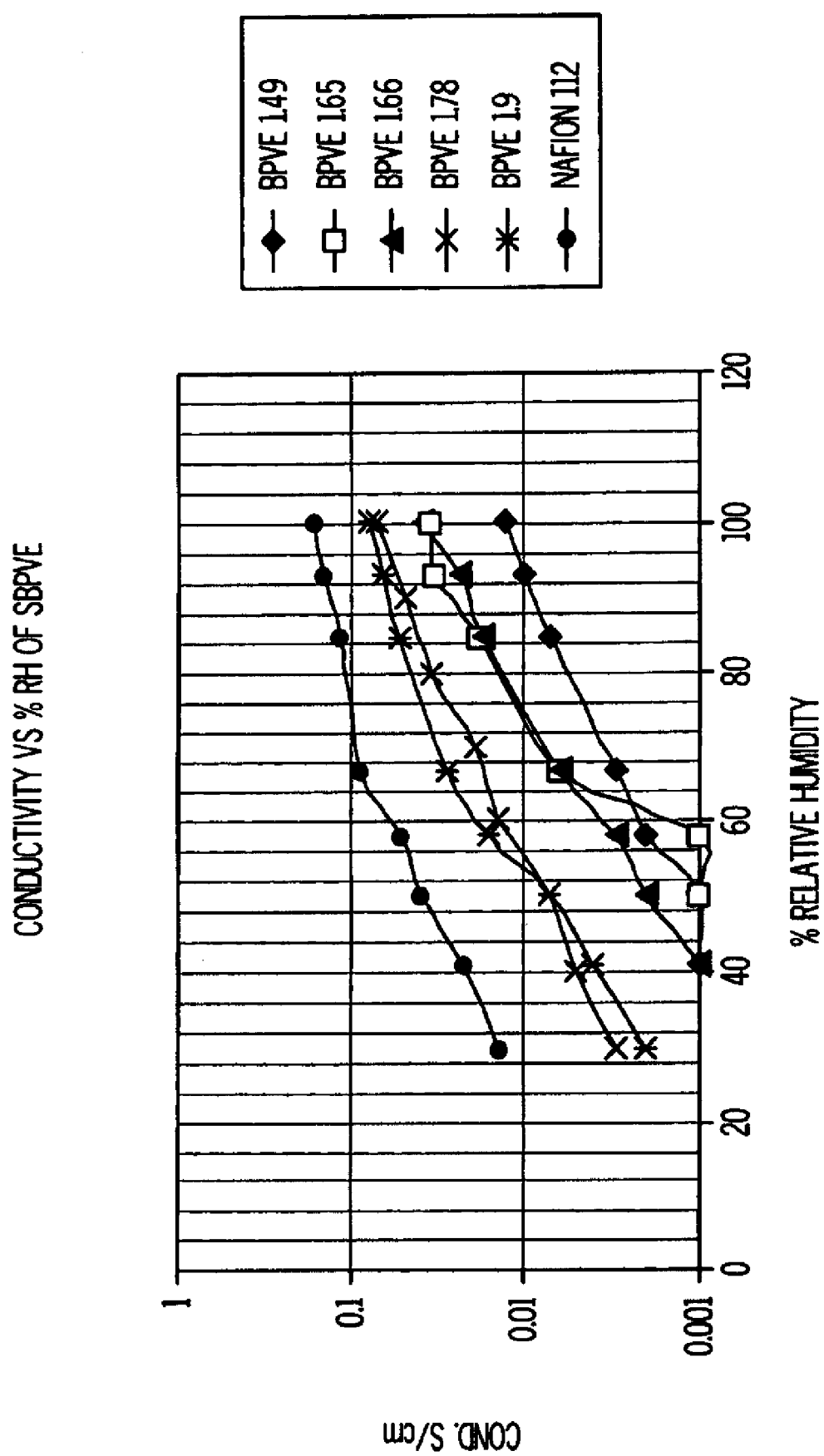
FIG. 2 is a graph depicting the conductivity vs. % relative humidity of sulfonated perfluorocyclobutane-biphenyl vinyl ether (BPVE) polymers 4 with different Ion Exchange Capacities (I.E.C.s)
Figure 3:
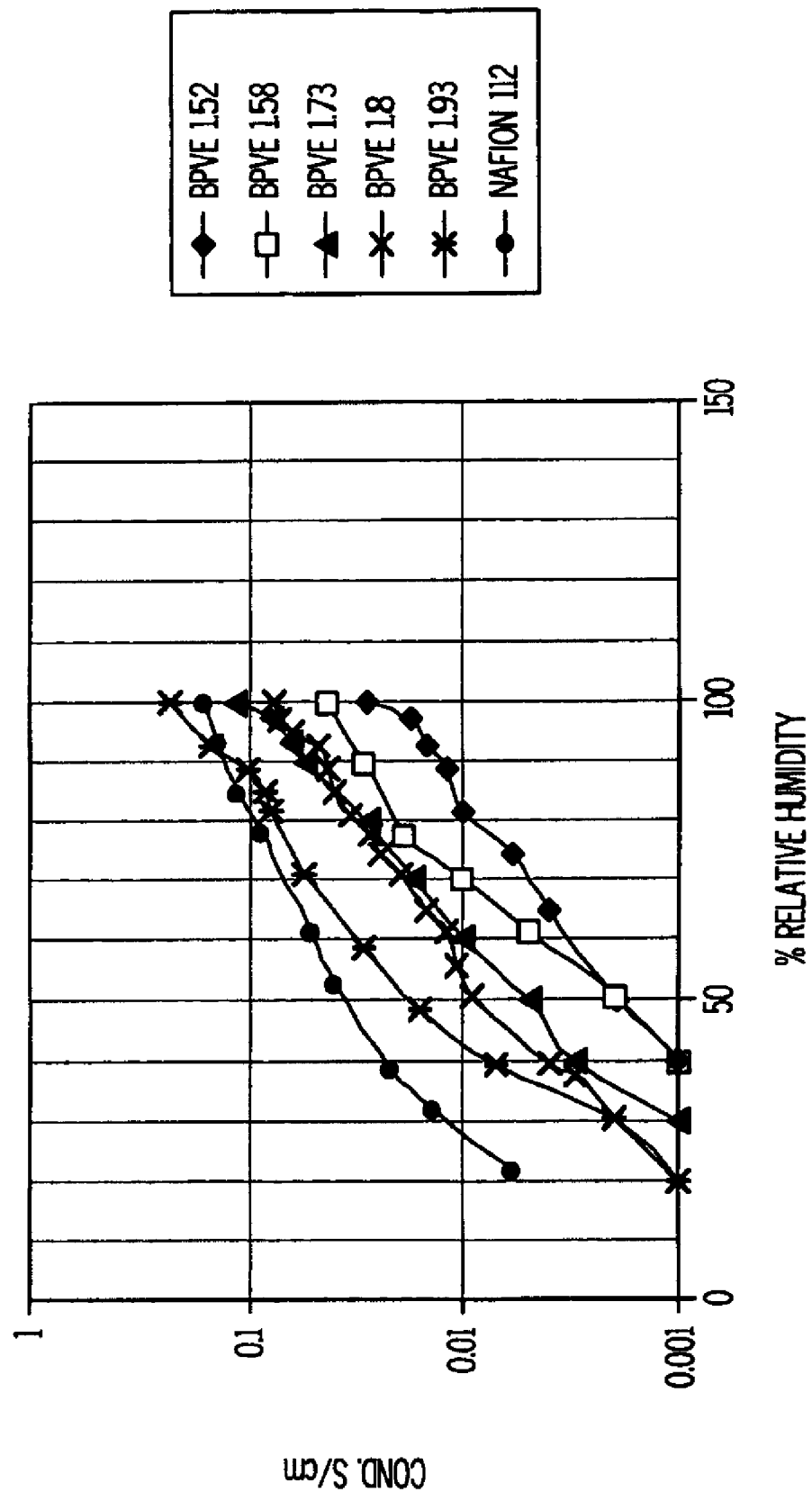
FIG. 3 is a graph depicting conductivity vs. % relative humidity of sulfonated perfluorocyclobutane-hexafluoroisopropylidene biphenyl vinyl ether (BPVE 6F) copolymers, 6 with different I.E.C.s.
Figure 4:
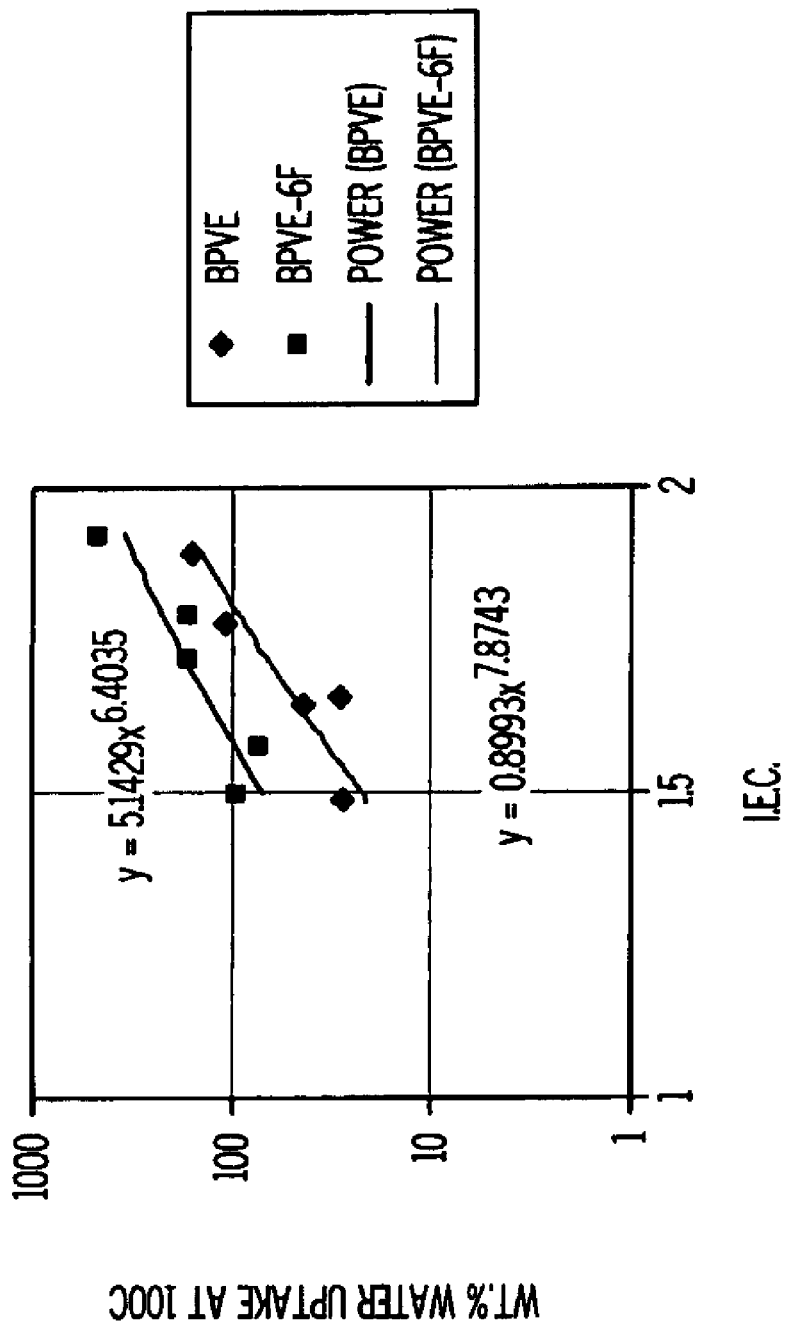
FIG. 4 is a graph depicting water uptakes for various sulfonated perfluorocyclobutane polymers.
Figure 5A:
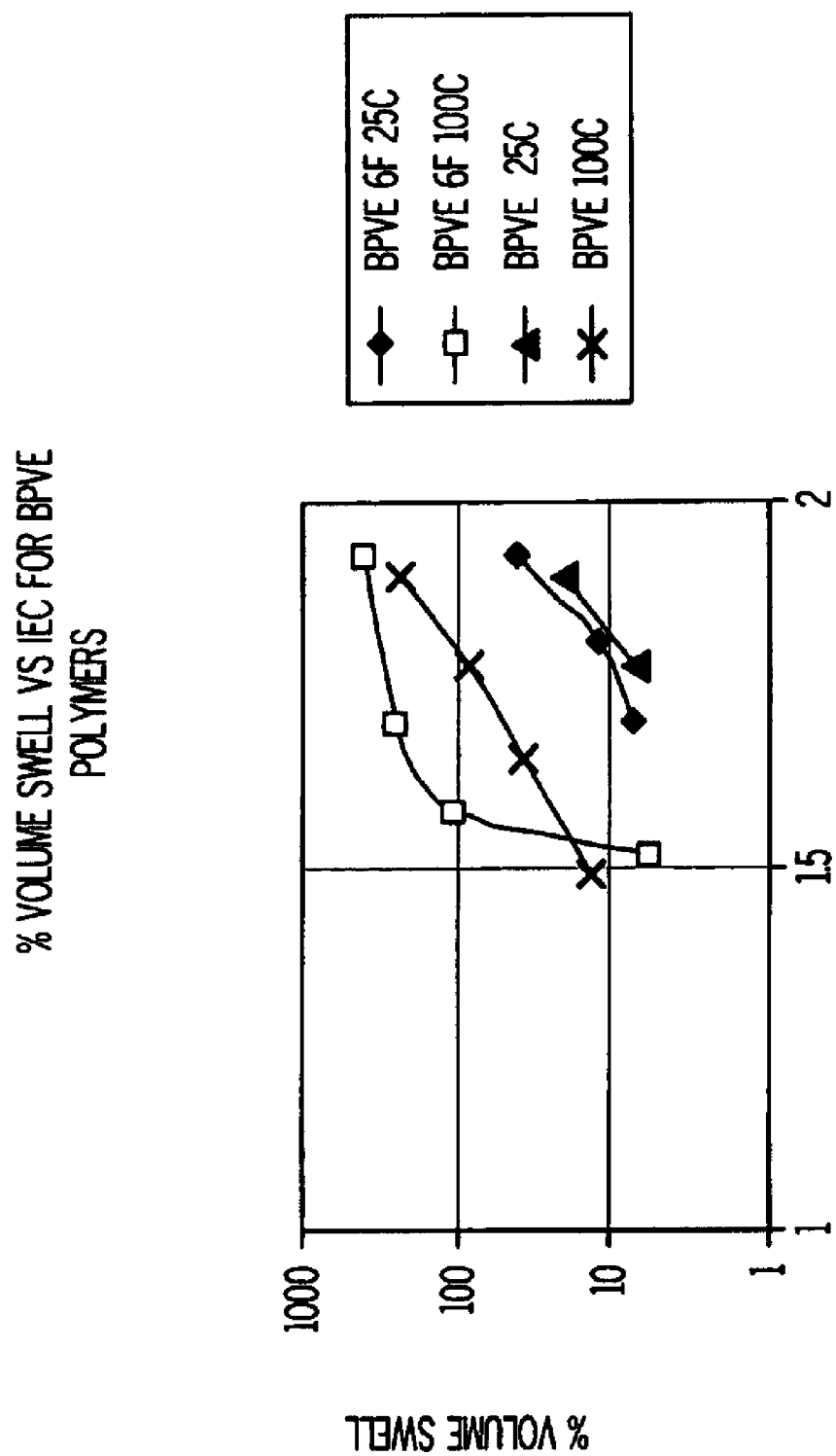
FIG. 5 is a graph depicting volume swell at 25 and 100° C. in water for PFCB Polymers, plotted as semi-log (A) and linear graph (B)
Figure 5B:
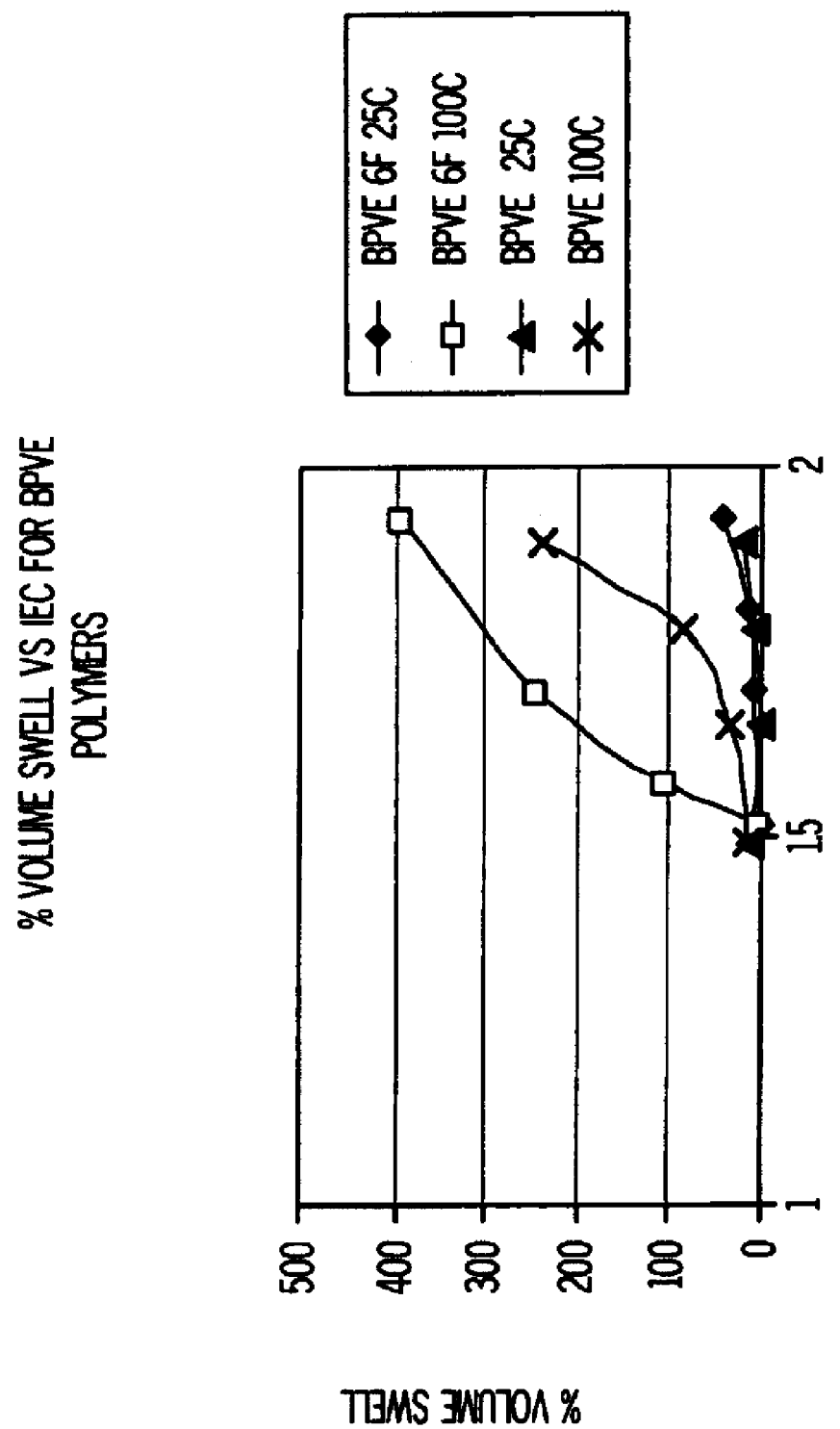

The solution is filtered through an 80-micron polypropylene filter cloth and is cast onto a glass plate (8-inch×8 inch) using a six-inch coating applicator bar with an 18-mil coating gap. The coated film is covered with a Pyrex glass dish, and then air-dried (to touch in about 10 minutes). A free-standing film is produced after floating the film off the glass with water. After extensive washing with water and air-drying, a 25-micrometer thick film is obtained. Pieces of the film (ca 0.02 g) are characterized by titration with standardized sodium hydroxide (0.010N) to determine its acid ion exchange capacity (see FIG. 1), by measuring proton conductivity versus percent relative humidity (see FIGS. 2 and 3), and by determining water uptake after 1-hour immersion in water at 25 and 100° C. (boiling water), see FIG. 4. Percent volume swell is determined for the PFCB polymers as well, see FIG. 5. A piece of the film (4-inch×4-inch) is then tested in a fuel cell using electrodes made of catalyst coated diffusion media (CCDM) made with a coating of platinum on carbon (Tanaka) that is milled with A-K 900 SS PFSA ionomer solution and then coated on top of carbon-fiber diffusion media with a microporous layer.

TABLE 1

Reaction Conditions to Prepare Sulfonated Perfluorocyclobutane Polymers Made with 30% Oleum

| Polymer | IEC, meas | IEC calcd | % $H_2O$ Uptake 100 C. | oleum/polymer | ratio | FCD # | Thickness μ |
|---|---|---|---|---|---|---|---|
| BPVE | 1.49 | 1.51 | 27.3 | 0.6171/1.0298 | 0.5992 | | |
| BPVE | 1.66 | 1.65 | 28.7 | 0.7244/1.0096 | 0.7175 | | |
| BPVE | 1.65 | 1.65 | 43.4 | 0.7289/1.0134 | 0.7193 | 1335 | 23 |
| BPVE | 1.78 | 1.78 | 105 | 0.8168/1.0033 | 0.8141 | 1408 | 11 |
| BPVE | 1.92 | 1.90 | 156 | 0.9655/1.0030 | 0.9626 | 1329 | 25 |

| Polymer | IEC, meas | IEC calcd | % H2O Uptake 100 C. | oleum/polymer | ratio | FCD # | Thickness μ |
|---|---|---|---|---|---|---|---|
| BPVE 6F | 1.52 | 1.51 | 95 | 0.6383/1.0030 | 0.6364 | 1410 | 22 |
| BPVE 6F | 1.58 | 1.56 | 73.8 | 0.6776/1.0280 | 0.6591 | 1303 | |
| BPVE 6F | 1.73 | 1.73* | 164 | 0.7698/1.0412 | 0.7393* | 1313 | |
| BPVE 6F | 1.80 | 1.80 | 161 | 0.7927/1.0237 | 0.7743 | 1330 | 25 |
| BPVE 6F | 1.93 | 1.93 | 474 | 0.932/1.116* | 0.8351* | 1320 | |

The ion exchange capacity of the sulfonated polymers 4-6 is dependent on the weight (or molar) ratio of the 30%-oleum used per gram of polymer (see FIG. 1). Thus, the I.E.C. of the respective polymers can be specifically controlled by the amount of oleum added. The sulfonation reaction is quite fast and non-selective towards the different biphenyl ether groups in the PFCB backbone, and reaction times are less than one hour. The polymer 5 can be sulfonated with 30% oleum within 20 minutes under the conditions described, but poor films were obtained with both the starting polymer and the sulfonated polymer due to its low molecular weight. Thus, films of the sulfonated polymer 5 were too brittle to be evaluated.

Figure 6:
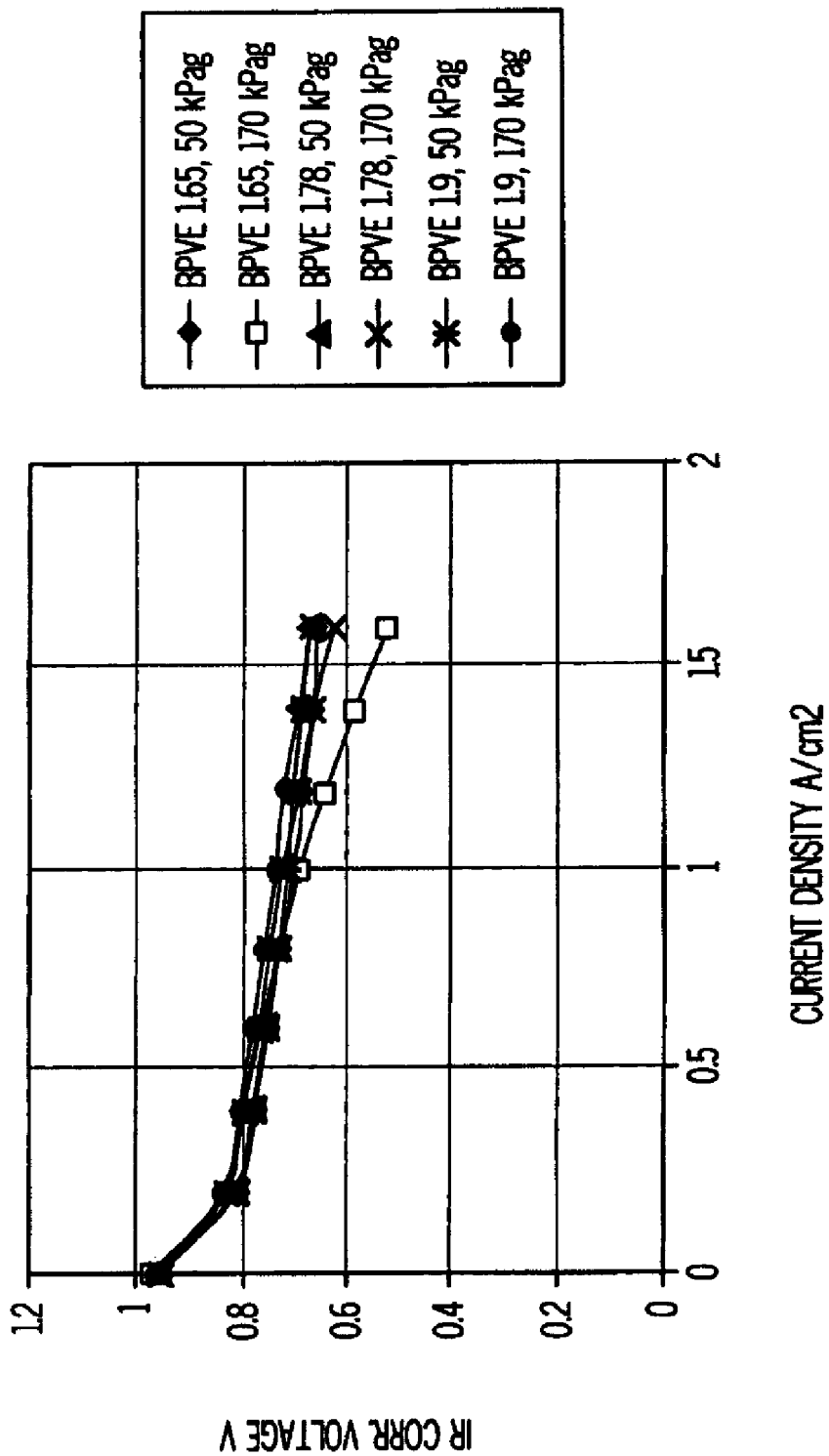
FIG. 6 is a graph of fuel cell data of sulfonated BPVE polymers depicting cell voltage (in volts) versus current density (in Amperes/cm$^2$), which has been IR-corrected for the experimentally measured High Frequency Resistance (HFR)
Figure 7:
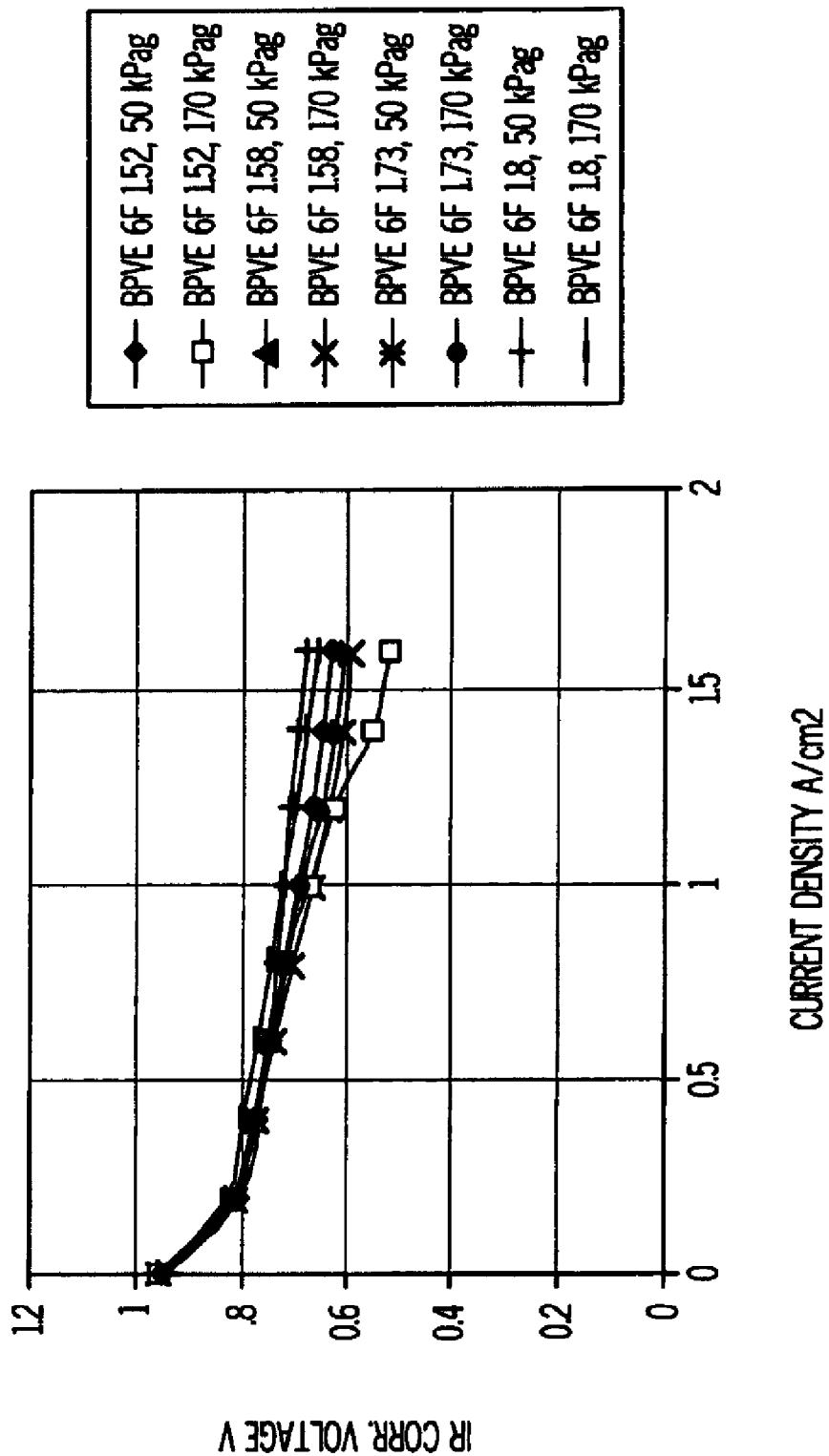
FIG. 7 is a graph of fuel cell data of sulfonated BPVE 6F copolymers depicting cell voltage (in volts) versus current density (in Amperes/cm$^2$), which has been IR-corrected for the experimentally measured High Frequency Resistance (HFR).

Good fuel cell performances were obtained for films made of the SBPVE polymer 4 with ion exchange capacities between 1.4 and 1.9 meq. of sulfonic acid per gram (see FIG. 6). With the sulfonated copolymer 6, flooding of the fuel cell took place with the PEM that had an I.E.C. of 1.9 meq/g of sulfonic acid. The other materials with between 1.52 and 1.8 meq/g of sulfonic acid showed very good fuel cell performance under the high-relative humidity conditions used (see FIG. 7).

All of the fuel cell results are summarized in Table 2.

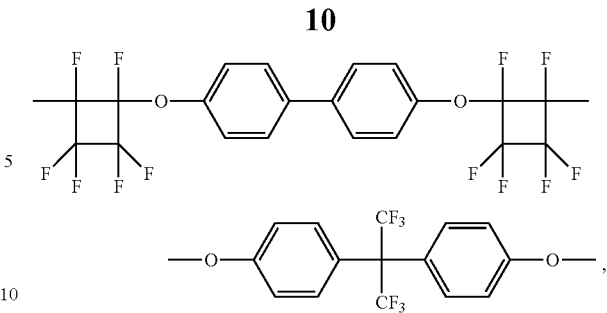

that is repeated n times to form a polymer block having the following formula:

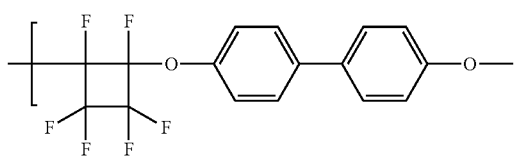

TABLE 2

Summary of Fuel Cell Tests on PFCB Polymers.

| Polymer | I.E.C. | Fuel Cell Test | Sulfonating Agent | $V_{uncorr}$ Low P, 50 kPa g | $V_{uncorr}$ High P, 170 kPa g | Assessment | Water Uptake 100 C. | Volume Swell 100 C. |
|---|---|---|---|---|---|---|---|---|
| BPVE-6F | 1.4 | FCD 1295 | ClSO$_3$H | 0.361 v at 0.8 A/cm 2 | 0.31 at 1.0 A/cm 2 | No Good | x | x |
| BPVE-6F | 1.5 | FCD 1410 | 30% oleum | 0.556 v at 1.2 A/cm 2 | 0.529 v at 1.2 A/cm 2 | Good | 29 | 24 |
| BPVE-6F | 1.58 | FCD 1303 | 30% oleum | 0.604 v at 1.2 A/cm 2 | 0.557 v at 1.2 A/cm 2 | Good | 74 | 104 |
| BPVE | 1.65 | FCD 1335 | 30% oleum | 0.564 v at 1.2 A/cm 2 | 0.529 v at 1.2 A/cm 2 | Good | 43 | 36 |
| BPVE | 1.68 | FCD 1309 | ClSO$_3$H | 0.268 v at 0.4 A/cm 2 | 0.27 v at 0.6 A/cm 2 | No Good | x | x |
| BPVE-6F | 1.73 | FCD 1313 | 30% oleum | 0.600 at 1.2 A/cm 2 | 0.586 v at 1.2 A/cm 2 | Good | 164 | 244 |
| BPVE-6F | 1.75 | FCD 1394 | ClSO$_3$H | 0.434 v at 1.2 A/cm 2 | 0.57 v at 1.2 A/cm 2 | Fair | 36 | x |
| BPVE | 1.78 | FCD 1408 | 30% oleum | 0.629 v at 1.2 A/cm 2 | 0.624 v at 1.2 A/cm 2 | Good | 105 | 84 |
| BPVE-6F | 1.8 | FCD 1330 | 30% oleum | 0.625 v at 1.2 A/cm 2 | 0.63 v at 1.2 A/cm 2 | Good | 161 | 151 |
| BPVE | 1.9 | FCD 1329 | 30% oleum | 0.606 v at 1.2 A/cm 2 | 0.637 v at 1.2 A/cm 2 | Good | 156 | 238 |
| BPVE-6F | 1.93 | FCD 1320 | 30% oleum | 0.311 v at 1.2 A/cm 2 | 0.493 v at 1.2 A/cm 2 | No Good | 474 | 393 |

In general, there is considerable concern about the oxidative stability of hydrocarbon membranes in fuel cells, and one ex-situ test consists of an assessment of membrane stability on immersion in Fenton's reagent. The polymers 4 and 6 showed a 17 to 18 wt. % loss after 19 hours in a Fenton's test solution made with 4-ppm $Fe^{2+}$ (ferrous chloride tetrahydrate) and 3% hydrogen peroxide in an oven set at 70° C. This compares with Nafion 112, which loses less than 0.5 wt. % under the same conditions.

What is claimed is:

1. A fuel cell comprising:
   a proton exchange membrane comprising an ion conducting polymer, the ion conducting polymer comprising a repeat unit described by the following formula:

-continued wherein n is from about 20 to about 500, the repeat unit being sufficiently sulfonated that the proton exchange membrane has an ion exchange capacity between 1.4 and 1.9 meq of sulfonic acid;
   an anode flowfield portion; and
   a cathode flowfield portion, the anode flowfield portion and cathode flowfield portion being disposed on opposite sides of the proton exchange membrane.

2. The fuel cell of claim 1 wherein each repeat unit comprises 0 to 2 sulfonic acid groups.

* * * * *